Feb. 20, 1934.  A. B. CADMAN  1,947,756
MOUNTING OF BRAKE ANCHORS
Original Filed March 7, 1932    2 Sheets-Sheet 1
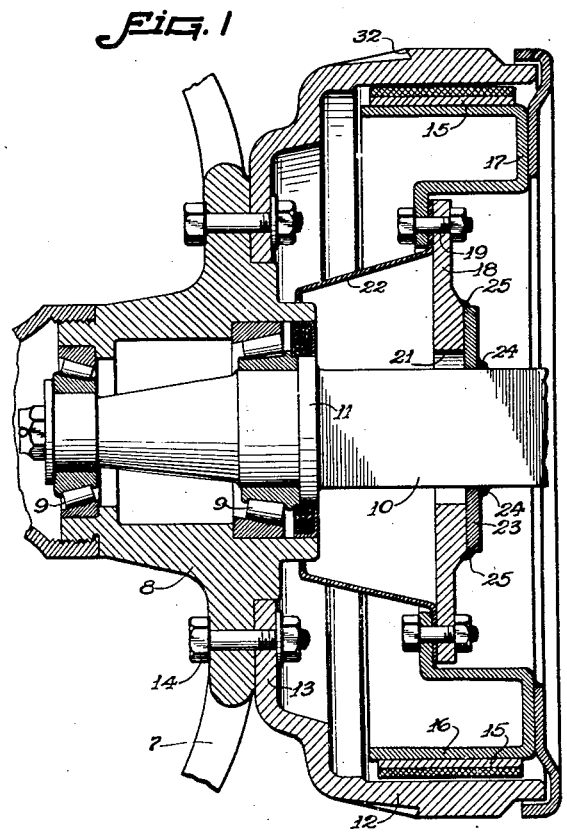
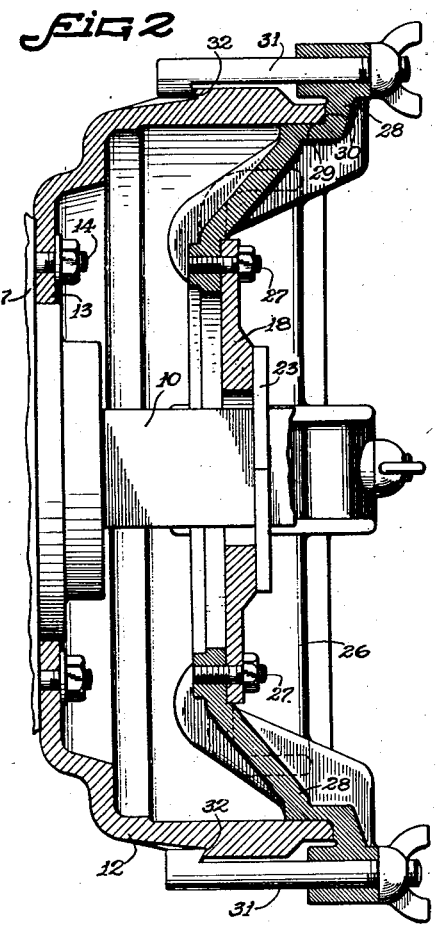
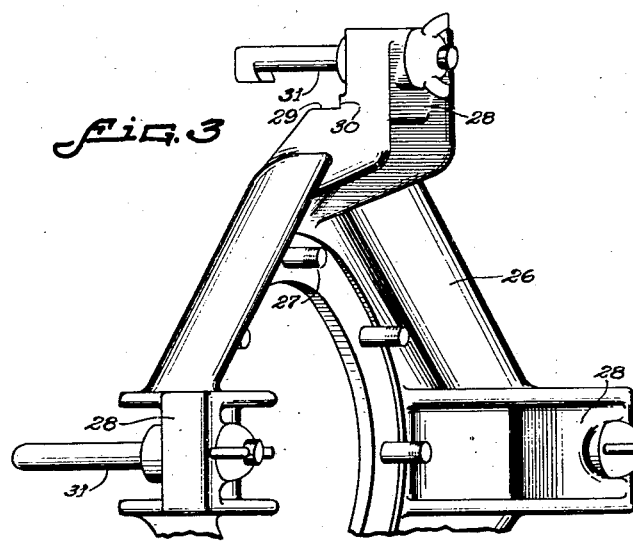
Inventor
Addi B. Cadman
Attorneys Feb. 20, 1934.   A. B. CADMAN   1,947,756
MOUNTING OF BRAKE ANCHORS
Original Filed March 7, 1932   2 Sheets-Sheet 2

Inventor
Addi B. Cadman
By Chindell, Parker & Carlson
Attorneys

Patented Feb. 20, 1934

1,947,756

UNITED STATES PATENT OFFICE 1,947,756

MOUNTING OF BRAKE ANCHORS

Addi Benjamin Cadman, Beloit, Wis., assignor to Warner Electric Brake Corporation, South Beloit, Ill., a corporation of Illinois Application March 7, 1932, Serial No. 597,283, Renewed January 15, 1934

15 Claims. (Cl. 29—84)

This invention relates generally to the mounting of the anchor members of vehicle brakes and more particularly to the mounting of such members on vehicle axles not originally equipped with brake mountings.

The primary object of the present invention is to simplify and reduce the cost of installing a brake on an axle not equipped with brake mountings through the provision of a new and improved method of mounting the anchor member of the brake on the axle.

Another object is to provide a novel method of attaching the anchor member to the axle and also of supporting the anchor member in proper position relative to the axle while the member is being attached.

In carrying out the foregoing object, the invention contemplates utilizing the wheel as a guide for locating the anchor member on the axle while the member is being secured to the axle by welding.

The invention also resides in the novel character of the apparatus employed in locating the anchor plate.

Other objects and advantages of the invention will become apparent from the following detailed description, taken in connection with the accompanying drawings, in which Figure 1 is a fragmentary view of a vehicle wheel and axle with a brake mounted thereon in accordance with the present invention.

Fig. 2 is a view similar to Fig. 1 with the anchor member of the brake supported in position for attachment to the vehicle axle.

Fig. 3 is a fragmentary perspective view of a fixture used in locating the anchor plate.

Figure 6:
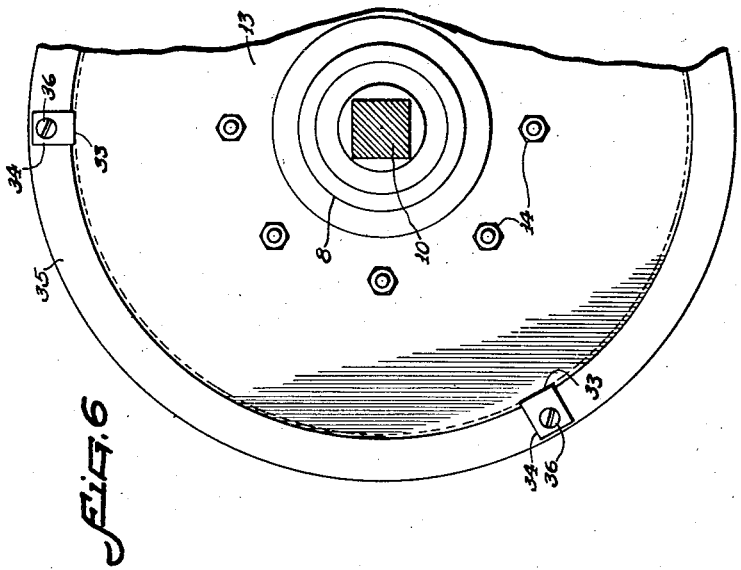
Fig. 6 is a fragmentary view of the drum shown in Fig. 5 looking toward the open end thereof.

Referring now to the drawings, the numeral 7 indicates a vehicle wheel having a hub 8 equipped with the usual roller bearings 9 rotatably supporting the hub on the tapered end of an axle 10. In the case of axles not originally equipped with brake mounting, the axle is of uniform cross-section shape, usually round or square, between flanges 11 which support the inner wheel bearings. Such an axle affords no means for attaching the anchor member of a brake thereto.

The brake shown by way of illustration includes a drum 12 having an inturned flange 13 at one end which may be secured to the wheel 7 in any suitable way as by bolts 14 extending through the flange and the spokes of the wheel. The drum is so mounted on the wheel that its internal cylindrical surface is concentric with the wheel axis. The non-rotatable friction element of the brake is in the form of a band 15 covered with friction material and supported, in the present instance, by a cylindrical flange 16 integral with the anchor member of the brake.

Preferably the anchor member comprises outer and inner parts in the form of an annular plate 17 and a disk 18 overlapping at their edges which are apertured to receive bolts 19 by which the parts are clamped detachably together in the assembled brake. The flange 16 is integral with the outer edge portion of the plate 17 to which may be secured suitable means for completing closure of the open end of the drum. The disk 18 is formed at its center with an aperture 21 of a size sufficient to enable the disk to pass over the bearing flange 11 when the disk is placed on the axle. In this two-part anchor assembly, it will be apparent that the disk 18 constitutes an adapter of simple construction which may be cut out at its center for use with any size of axle and which enables the plate 17 to be made of uniform construction regardless of cross-section shape of the axle on which the brake is to be used. The bolts 19 may also serve to secure a lubricant deflecting guard 22 in place overlying the inner end of the hub 8.

The present invention contemplates attachment of the disk 18 to the axle by forming a metal weld around the axle surface. To thus attach the disk in the case of an axle having a bearing flange 11 substantially larger than the cross-section of the axle proper, a supplemental adapter member is employed constructed to lie against the disk 18 with an edge disposed closely adjacent and preferably in abutment with the surface of the axle section forming the brake anchorage. Herein the supplemental adapter is in the form of a plate 23 comprising two U-shaped parts recessed to conform to the shape of the axle and separable to permit assembly on the axle by movement transversely thereof. With the member 23 properly positioned, the disk 18 may be made rigid with the axle by welding the inner edge of the member 23 to the axle at 24 and the outer edge to the disk 18 at 25.

In order that the anchor will support the band 15 concentric with and longitudinally centered with respect to the internal drum surface, the adapter 18 must, during formation of the welds 24 and 25, be held accurately centered with respect to the axis of the axle and properly located longitudinally thereof. This is accomplished simply and conveniently in accordance with the present invention by using the wheel bearing surfaces on the axle as a guide to establish the proper position of the adapter. Preferably, this guide surface is utilized through the medium of the wheel originally mounted thereon and the brake drum which is first secured to the wheel in concentric relation to the wheel axis. A fixture is employed to which the adapter 18 may be temporarily secured and which, when secured to the drum with the wheel in position on the axle, supports the adapter in exactly the same position the latter is to occupy in the assembled brake structure.

In the form shown in Figs. 2 and 3, the fixture comprises a frame or spider 26 having a central aperture, the defining edge portion of which is formed with threaded studs 27 positioned to enter the holes in the adapter plate 18 so that the latter may be secured temporarily to the fixture in a definite position. Projecting radially from the frame 26 are a plurality, four in the present instance, of arms 28 having shoulders 29 adapted to fit snugly within the internal or friction surface of the drum and spaced equidistant from the drum axis so as to center the adapter plate 18 with respect to the wheel axis when the fixture is in place. Surfaces 30 on the arms 28 abut against the end of the drum and thereby locate the adapter in proper longitudinal position. After being assembled on the drum, the fixture is fastened rigidly thereto by suitable means such as clamping bolts 31 having their threaded ends extending through the outer ends of the arms 28 and the other ends engaging means such as shoulders 32 on the drum.

The installation of a brake with the mechanism above described is accomplished as follows. The drum of the brake is first mounted on the wheel with the axis of its cylindrical surface coinciding with the wheel axis. With the adapter 18 cut out at its center to pass over the bearing flange 11 of the axle, the adapter is first bolted to the fixture 26 and the latter assembled in and clamped to the drum. The wheel is then placed on the axle in its regular position so that the adapter is supported through the medium of the wheel, the brake drum and the fixture in exactly the position it is intended to occupy in the wheel and brake assembly.

Next the split member 23 is placed on the axle against the adapter and each of its parts are then spot welded to the axle and to the adapter plate after which the welds 24 and 25 of the desired thickness are formed completely around the axle and the outer edge of the plate 23. The adapter is thereby made rigid with the axle. After removal of the nuts from the studs 27, the wheel may be removed and the anchor plate 17 assembled on the adapter and secured thereto by means of the bolts 19. The brake assembly is completed by replacement of the wheel on the axle after removal of the fixture 26 from the drum.

Figure 5:
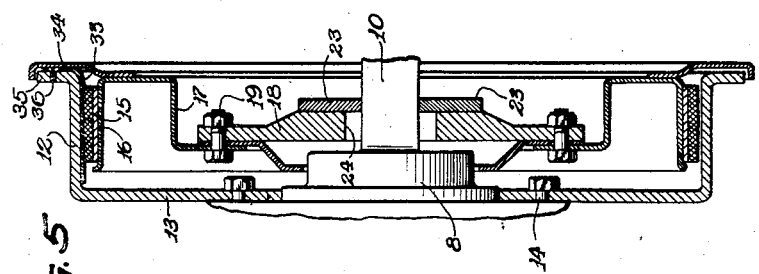
Fig. 5 is a view similar to Fig. 2 illustrating a modified method of locating the anchor member.
Figure 4:
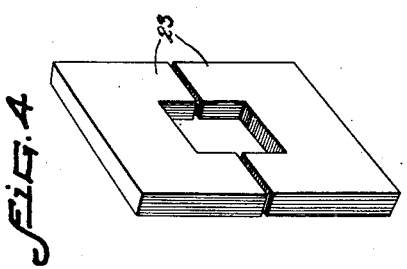
Fig. 4 is a perspective view of the parts employed in attaching the anchor member to the axle.

Instead of employing the specially constructed frame 26, the unit comprising the non-rotatable parts of the brake may be used as the fixture for locating the adapter during welding. To thus support the adapter, means is provided for enabling the anchor member 17 with the band 15 thereon to be secured to the drum in centered position. As shown in Figs. 5 and 6, this means comprises a plurality of shims 33 located at annularly spaced points around the drum and fitting snugly between the internal surface of the drum and the external surface of the friction covering the band 15. Herein the shims have a laterally projecting arm 34 which, in the type of drum shown in Figs. 5 and 6, abuts against a flange 35 on the drum and is temporarily secured thereto as by a stud 36 extending through a hole formed in the drum flange.

When the parts of the brake are thus used as the fixture, the brake is installed in the following manner. The shims 33 are first secured to the drum which is then assembled with the anchor plate and brake band as shown in Fig. 5, the adapter 18 bolted to the plate 17. Then the wheel is mounted on the axle thereby locating the adapter definitely with respect to the axle. The welds 24 and 25 are then formed after which the wheel is removed from the axle to permit detachment of the shims 33.

By utilizing the wheel bearing surface as a guide for locating the anchor member of the brake during attachment thereof to the axle and welding the anchor member to the axle, it will be apparent that a brake may be installed on an axle without removing the axle from the vehicle, without expensive equipment and without the aid of skilled labor. Installation may thus be effected quickly and conveniently at a minimum cost.

I claim as my invention:

1. For mounting an anchor member of a brake on an axle having a wheel adapted to be mounted rotatably on one end of said axle, the method which consists in establishing a concentric relation between the drum of the brake and said wheel, establishing a concentric relation between said drum and anchor member, mounting said wheel on said axle, and securing said anchor member to the axle while the member is thus supported.

2. For mounting an anchor member of a brake on an axle having a wheel adapted to be mounted rotatably on one end of said axle, the method which consists in securing said anchor member to said wheel in concentric relation to the wheel axis, mounting said wheel on said axle, and securing said member to the axle with the member thus located.

3. For mounting the anchor member of a brake on an axle having a wheel adapted to be mounted rotatably on one end of the axle, the method which consists in securing said drum to said wheel with the friction surface of the drum concentric with the wheel axis, securing said drum and member together in the positional relation which they occupy in the assembled brake, mounting said wheel on said axle whereby to locate said member with respect to the axle, and welding said member to the axle.

4. For mounting the anchor member of a brake on an axle having a wheel adapted to be mounted rotatably on one end of the axle, the method which consists in mounting said member on said wheel in the position to be occupied by the member in the wheel and brake assembly, mounting said wheel on the axle thereby determining a definite relation between said member and said axle, and welding the member to the axle while thus supported thereon.

5. The method of mounting an anchor member of a brake on an axle which consists in supporting said member through the medium of the wheel bearing surface of said axle whereby to utilize such surface as a guide in determining the axial position of said member relative to the axle, and rigidly attaching the member to said axle while thus supported.

6. The method of mounting the anchor member of a brake on an axle having a wheel removably mounted thereon which consists in securing the drum of said brake to said wheel with the friction surface of said drum concentric with the wheel axis, assembling the brake with shims between said drum surface and the non-rotatable friction surface of the brake whereby to locate the anchor member with respect to the wheel axis, mounting said wheel and brake assembly on said axle, and securing said anchor member and said axle together while the member is thus supported by the drum.

7. The method of mounting the anchor member of a brake on an axle having a wheel removably mounted thereon which consists in securing the drum of said brake to said wheel with the friction surface of said drum concentric with the wheel axis, securing the drum and non-rotatable parts of the brake together in concentric relation, mounting said wheel and brake assembly on said axle whereby to support said member in centered position with respect to said axle, and attaching said member to the axle while thus supported.

8. For use in mounting an anchor member of a brake on an axle, a fixture for supporting said member in the same relation to the drum of the brake that the member occupies in the assembled brake comprising a frame adapted to be received in the open end of said drum and temporarily secured thereto, and means for securing said anchor member to said frame in a predetermined position.

9. For use in mounting an anchor member of a brake on an axle, a fixture for supporting said member in the same relation to the drum of the brake that the member occupies in the assembled brake comprising a frame adapted to abut against the open end of said drum to determine the position of the frame longitudinally of the drum axis and to be centered with respect to the braking surface thereof by engagement with said surface, and means for detachably securing said member and said frame together in a predetermined positional relation.

10. For use in mounting an anchor member of a brake on an axle having a wheel rotatably mounted thereon, the combination of a brake drum of said brake secured to said wheel and having a friction surface concentric with the wheel axis, and a temporary support for said anchor member adapted, when engaging said surface, to locate said member in the same position relative to said surface that the member is intended to occupy in the assembled brake.

11. The method of mounting an anchor member on an axle not originally equipped with brake mountings comprising utilizing a machined surface of the wheel bearing on said axle to establish the desired positional relation between said anchor member and the axle, and welding said member to the axle while said relation remains established.

12. A means for mounting upon an axle a brake anchorage having a centrally apertured plate adapted to fit over one end of said axle comprising supporting means for said plate locating the same in centered position with respect to said axle in combination with parts separable to receive said axle between them and adapted to be secured to the apertured plate and axle to maintain it in the centered position determined by said supporting means.

13. For use with a vehicle axle without machining the latter or removing the same from the vehicle, a means for mounting upon said axle a brake anchorage having an apertured plate adapted to fit over one end of the axle comprising supporting means for said plate locating the same in centered position with respect to said axle in combination with a part lying against said plate in overlapping relation to the aperture therein so as to permit said part and plate to be joined by welding at their junction, said part closely following a portion of the axle periphery so as to permit joining of the two by welding.

14. Means for locating a brake anchorage member on a vehicle axle having an annular machined surface on one end thereof comprising a fixture adapted to be received on one end of said axle having surfaces engageable with said first mentioned surface whereby to locate the fixture in a predetermined axial and centered position, and means detachably and rigidly securing said member to said fixture in axially spaced and centered relation with respect thereto locating said member in the position the member is to occupy in the wheel brake assembly for said axle.

15. Means for locating a brake anchorage member on a vehicle axle having an annular wheel bearing surface comprising a fixture having a complemental surface adapted to be received on said first mentioned surface to locate the fixture in a predetermined axial and centered position, and means detachably securing said member to said fixture in the same positional relation to said fixture surface that said member is to occupy in the wheel brake assembly relative to said axle surface.

ADDI BENJAMIN CADMAN.